(12) United States Patent
Loh

(10) Patent No.: US 12,505,817 B1
(45) Date of Patent: Dec. 23, 2025

(54) SYSTEM AND METHOD FOR ENHANCING VISUAL CONTRAST WHILE PRESERVING FORMATTING WHEN PROVIDING A DARK VIEWING MODE

(71) Applicant: Microsoft Technology Licensing, LLC, Redmond, WA (US)

(72) Inventor: Philip Zhian Loh, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/975,302

(22) Filed: Dec. 10, 2024

(51) Int. Cl.
*G09G 5/06* (2006.01)
*H04N 21/431* (2011.01)

(52) U.S. Cl.
CPC ........... *G09G 5/06* (2013.01); *H04N 21/4312* (2013.01); *G09G 2320/0238* (2013.01); *G09G 2320/0242* (2013.01); *G09G 2320/0646* (2013.01); *G09G 2340/06* (2013.01)

(58) Field of Classification Search
CPC ............ G09G 5/02; G06F 9/451; G06F 3/048
See application file for complete search history.

(56) References Cited

U.S. PATENT DOCUMENTS

| 10,319,116 | B1 | 6/2019 | C et al. | |
|---|---|---|---|---|
| 2002/0159080 | A1 | 10/2002 | Feng et al. | |
| 2014/0362105 | A1* | 12/2014 | Kocienda | G09G 5/02 345/600 |
| 2017/0205977 | A1* | 7/2017 | Fertik | G09G 5/02 |

* cited by examiner

*Primary Examiner* — Kevin M Nguyen
(74) *Attorney, Agent, or Firm* — Novo TechIP International PLLC

(57) ABSTRACT

A method of providing a dark viewing mode with enhanced visual contrast includes evaluating the luminance and chroma of background colors, including highlight colors, of digital content prior to converting the digital content for the dark viewing mode to identify highlight colors having a luminance value that exceeds a luminance value threshold and a chroma value that exceeds a chroma value threshold. When a highlight color has luminance and chroma values that exceed the respective threshold values, the luminance value of the highlight color is clamped to a predetermined lower luminance value before converting the value for the dark viewing mode. The luminance value is converted for dark viewing mode by taking the opposite luminance value. As a result, the luminance value of the converted highlight color has a higher luminance value and greater luminance contrast with respect to the dark background in dark viewing mode.

20 Claims, 7 Drawing Sheets

SYSTEM AND METHOD FOR ENHANCING VISUAL CONTRAST WHILE PRESERVING FORMATTING WHEN PROVIDING A DARK VIEWING MODE

BACKGROUND

Dark viewing mode, also known as "dark mode," is a display setting that uses a darker color scheme, typically featuring light text on a dark background. This mode is designed to reduce the brightness of your screen, which can be easier on the eyes in low-light conditions and may help reduce eye strain, especially when working for extended periods. It's commonly available on many devices, apps, and websites, and often can be toggled in system settings or app preferences.

Previously known methods of providing a dark viewing mode have faced difficulties in converting text colors for dark viewing mode in a manner that preserves the color formatting of the text and that is sufficiently distinguishable from the dark background color to facilitate reading. The visibility/readability of the text depends at least in part on the luminance contrast between the text and background. High luminance contrast (e.g., black text against a white background) is a sharp difference in brightness which improves readability, visibility, and visual clarity. Some methods of providing a dark viewing mode have attempted to improve the visibility of text by selecting a text color having the opposite luminance relative to the luminance of the original text. This has proven to be an effective means of converting text colors for the dark viewing mode. However, this method has resulted in unsatisfactory results when text color formatting includes highlighting (e.g., marking text with a light background color to distinguish the selected text from the text around it).

Hence, what is needed is a system and method of enhancing visual contrast when providing a dark viewing mode that preserves the text and highlight color formatting of the original content.

SUMMARY

In one general aspect, the instant disclosure presents a data processing system for providing a dark viewing mode with enhanced viewing contrast that includes a processor and a memory in communication with the processor wherein the memory stores executable instructions that, when executed by the processor alone or in combination with other processors, cause the data processing system to perform multiple functions. The functions include receiving digital content that is to be displayed in a content display area of a graphical user interface (GUI) of a software application on a display device in a dark viewing mode, the digital content including highlighted text and a background, the highlighted text being defined by a text color and a first highlight color; parsing the digital content to extract the text color, the first highlight color, and the first background color using the processor; converting the text color into a first text luminance value and the first highlight color into a first highlight luminance value and a chroma value using a color conversion component which is programmed to convert colors from a first color space to corresponding representations in a second color space; performing a dark mode conversion process on the digital content to generate modified digital content using the processor, the dark mode conversion process including: accessing the memory to retrieve a predefined background luminance for the dark viewing mode; determining a luminance contrast between the first text luminance value and predetermined background luminance and correlating the luminance contrast to a second text luminance value for the dark viewing mode using the color conversion component; and selecting a modified highlight luminance value for the dark viewing mode by performing a highlight luminance selection process using the processor, the highlight luminance selection process comprising: accessing the memory to retrieve a predetermined luminance value threshold and a predetermined chroma value threshold; comparing the first highlight luminance value to the predetermined luminance value threshold and the chroma value to the predetermined chroma value threshold using the processor; in response to the first highlight luminance value being below the luminance value threshold or the chroma value being below the chroma value threshold, selecting the first highlight luminance value as a selected luminance value for the first highlight color; in response to the first highlight luminance value exceeding the luminance value threshold and the chroma value exceeding the chroma value threshold, selecting a predetermined second highlight luminance value as the selected luminance value for the first highlight color, the second highlight luminance value being less than the first highlight luminance value; and selecting the modified highlight luminance value to an opposite luminance value from the selected luminance value using the processor; converting the predetermined background luminance value, the second text luminance, and the modified highlight luminance value into a second background color, a second text color, and a modified highlight color, respectively, for the dark viewing mode using the color conversion component that programmed to convert luminance values from the second color space to corresponding representations in the first color space; automatically generating the modified digital content by changing the first background color of the digital content to the second background color, changing the first text luminance value of the digital content to the second text luminance value, and changing the first highlight color of the digital content to the modified highlight color using the processor; and rendering the modified digital content in the content display area of the GUI of the software application on the display device in place of the digital content.

In yet another general aspect, the instant disclosure presents a method of providing a dark viewing mode with enhanced viewing contrast for a software application. The method includes receiving digital content that is to be displayed in a content display area of a graphical user interface (GUI) of a software application on a display device in a dark viewing mode, the digital content including highlighted text and a background, the highlighted text being defined by a text color and a first highlight color; parsing the digital content to extract the text color, the first highlight color, and the first background color using the processor; converting the text color into a first text luminance value and the first highlight color into a first highlight luminance value and a chroma value using a color conversion component which is programmed to convert colors from a first color space to corresponding representations in a second color space; performing a dark mode conversion process on the digital content to generate modified digital content using the processor, the dark mode conversion process including: accessing the memory to retrieve a predefined background luminance for the dark viewing mode; determining a luminance contrast between the first text luminance value and predetermined background luminance and correlating the luminance contrast to a second text luminance value for the dark viewing mode using the color conversion component; and selecting a modified highlight luminance value for the dark viewing mode by performing a highlight luminance selection process using the processor, the highlight luminance selection process comprising: accessing the memory to retrieve a predetermined luminance value threshold and a predetermined chroma value threshold; comparing the first highlight luminance value to the predetermined luminance value threshold and the chroma value to the predetermined chroma value threshold using the processor; in response to the first highlight luminance value being below the luminance value threshold or the chroma value being below the chroma value threshold, selecting the first highlight luminance value as a selected luminance value for the first highlight color; in response to the first highlight luminance value exceeding the luminance value threshold and the chroma value exceeding the chroma value threshold, selecting a predetermined second highlight luminance value as the selected luminance value for the first highlight color, the second highlight luminance value being less than the first highlight luminance value; and selecting the modified highlight luminance value to an opposite luminance value from the selected luminance value using the processor; converting the predetermined background luminance value, the second text luminance, and the modified highlight luminance value into a second background color, a second text color, and a modified highlight color, respectively, for the dark viewing mode using the color conversion component that programmed to convert luminance values from the second color space to corresponding representations in the first color space; automatically generating the modified digital content by changing the first background color of the digital content to the second background color, changing the first text luminance value of the digital content to the second text luminance value, and changing the first highlight color of the digital content to the modified highlight color using the processor; and rendering the modified digital content in the content display area of the GUI of the software application on the display device in place of the digital content.

In a further general aspect, the instant application describes a non-transitory computer readable medium on which are stored instructions that when executed cause a programmable device to perform functions of In a further general aspect, the instant application describes a non-transitory computer readable medium on which are stored instructions that when executed cause a programmable device to perform functions of receiving digital content that is to be displayed in a content display area of a graphical user interface (GUI) of a software application on a display device in a dark viewing mode, the digital content including highlighted text and a background, the highlighted text being defined by a text color and a first highlight color; parsing the digital content to extract the text color, the first highlight color, and the first background color using the processor; converting the text color into a first text luminance value and the first highlight color into a first highlight luminance value and a chroma value using a color conversion component which is programmed to convert colors from a first color space to corresponding representations in a second color space; performing a dark mode conversion process on the digital content to generate modified digital content using the processor, the dark mode conversion process including: accessing the memory to retrieve a predefined background luminance for the dark viewing mode; determining a luminance contrast between the first text luminance value and predetermined background luminance and correlating the luminance contrast to a second text luminance value for the dark viewing mode using the color conversion component; and selecting a modified highlight luminance value for the dark viewing mode by performing a highlight luminance selection process using the processor, the highlight luminance selection process comprising: accessing the memory to retrieve a predetermined luminance value threshold and a predetermined chroma value threshold; comparing the first highlight luminance value to the predetermined luminance value threshold and the chroma value to the predetermined chroma value threshold using the processor; in response to the first highlight luminance value being below the luminance value threshold or the chroma value being below the chroma value threshold, selecting the first highlight luminance value as a selected luminance value for the first highlight color; in response to the first highlight luminance value exceeding the luminance value threshold and the chroma value exceeding the chroma value threshold, selecting a predetermined second highlight luminance value as the selected luminance value for the first highlight color, the second highlight luminance value being less than the first highlight luminance value; and selecting the modified highlight luminance value to an opposite luminance value from the selected luminance value using the processor; converting the predetermined background luminance value, the second text luminance, and the modified highlight luminance value into a second background color, a second text color, and a modified highlight color, respectively, for the dark viewing mode using the color conversion component that programmed to convert luminance values from the second color space to corresponding representations in the first color space; automatically generating the modified digital content by changing the first background color of the digital content to the second background color, changing the first text luminance value of the digital content to the second text luminance value, and changing the first highlight color of the digital content to the modified highlight color using the processor; and rendering the modified digital content in the content display area of the GUI of the software application on the display device in place of the digital content.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
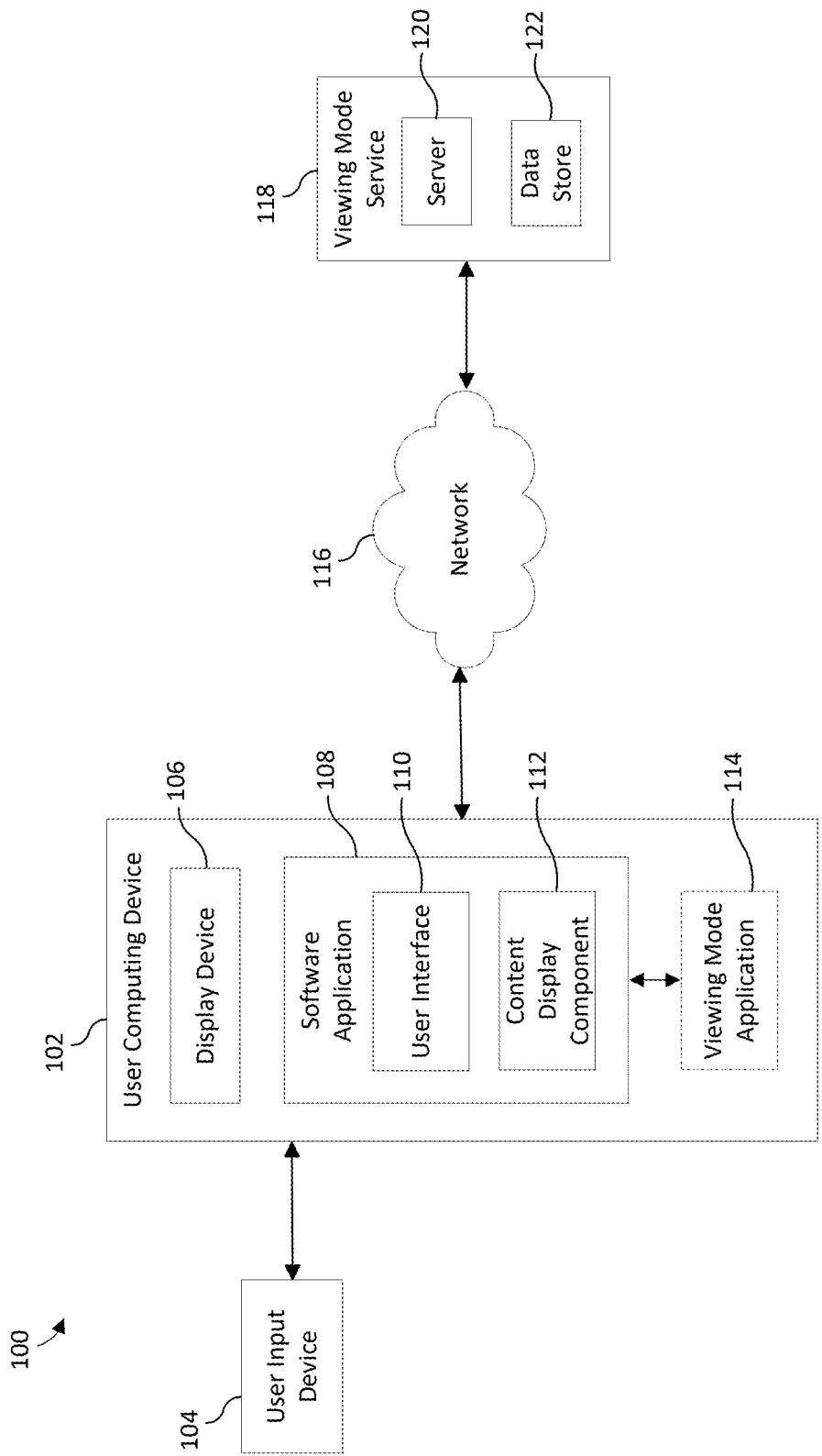
FIG. 1 depicts an example system upon which aspects of this disclosure may be implemented.

As discussed above, previously known applications which are capable of providing a dark viewing mode still have difficulties in converting background colors and text colors of content for dark viewing mode in a manner that preserves the color formatting of the text while satisfying a desired level of readability/visibility. For example, text colors which are clearly visible against a white or light background, such as black and dark shades of gray, blue, red, etc., can be difficult to distinguish from a dark background. This is due at least in part to insufficient luminance contrast between the text color and background color of the content. The luminance of a color is a measure used to describe the perceived brightness of a color. Higher luminance means a brighter color, visually appearing closer to white, while lower luminance results in darker shades, approaching black.

Luminance contrast refers to the difference in brightness between two adjacent surfaces or objects (e.g., text and background), typically measured as the ratio of their luminance values. High luminance contrast (e.g., black text against a white background and vice versa) is a sharp difference in brightness which improves readability, visibility, and visual clarity. Low luminance contrast (e.g., light gray text on a white background or dark gray text on a black background) means that the text and the background color are similar in brightness which can make the text difficult to distinguish from the background and therefore difficult to see and hard to read.

One method that has been used in an effort to preserve text color formatting while maintaining a desired level of visibility/readability is modifying the luminance value of the text color in order to increase the luminance contrast between the text color and background color. In other words, the same text color can be used by selecting the color having a luminance value that achieves a desired level of luminance contrast with the background color. This typically involved determining an opposite luminance value for the text color relative to the luminance value of the original text color. For example, if luminance is defined on a scale of 0 to 100, the opposite luminance value L' for a color having a luminance value L can determined using the formula L'=100−L. The text color used for dark viewing mode therefore corresponds to the original text color depicted with the opposite luminance value relative to the luminance value of the text color as depicted in light viewing mode. As a result, the visibility of the text color against the dark background is improved.

Selecting text colors for dark viewing mode that have the opposite luminance value relative to the luminance value of the original text color is an effective way of improving the visibility of text when switching to dark viewing mode in most cases. However, this method of converting colors for dark viewing mode can still produce unsatisfactory results when faced with another type of text color formatting, i.e., highlighting. Highlighting refers to the use of a separate color for the background color of selected text to distinguish the selected text from the text around it. The highlighting color is typically a light color, such as yellow, green, etc., that is distinguishable from both the background color (e.g., white) and the text color. In this case, converting the content colors for dark viewing mode involves converting the highlighting color which is the background color for the text.

One previously known method of handling text highlighting when converting text for dark viewing mode would convert highlight colors in substantially the same manner as text, i.e., by selecting a highlight color having the opposite luminance value from the luminance value of the original highlight color. However, this would typically result in the selection of a highlight color for the dark viewing mode that was difficult to see with respect to the dark background. It was thought that this was primarily due to the low luminance contrast between the converted highlight color and the dark background. However, it has been found that this is not a complete explanation of why the converted highlight colors were difficult to see with respect to the dark background. The original highlight color and the original light background color also typically have a low luminance contrast. What makes the original highlight color visible with respect to the light background is the chromatic contrast between the highlight color and the light background. Chromatic contrast is the difference in color saturation and/or intensity between two adjacent objects or areas (i.e., text and background), rather than just a difference in brightness. It plays a key role in visual perception by helping the human eye distinguish objects based on their color differences, even if their luminance (brightness) is similar. High chromatic contrast makes objects easier to identify and differentiate from the background. White has a chroma value of 0, meaning it has no saturation or color intensity. A yellow highlight color has a relatively high chroma value with respect to a white background which in turn results in a relatively high chromatic contrast between the two. As a result, a yellow highlight color is easily distinguishable from the white background.

The previously known process used to convert highlight colors for dark viewing mode would set the luminance value for the converted highlight color to the opposite luminance value from the original highlight color while keeping the same high chroma value as the original highlight color. The resulting color, however, would have a luminance value and a chroma value combination that would cause the color to be out-of-gamut. Gamut refers to the complete range of colors of a color space that can be accurately displayed or reproduced. Colors which are outside of that range of colors are considered out-of-gamut and are not capable of being displayed or reproduced. The previously known conversion process would initially result in the selection of a color that was out-of-gamut. The color was then further converted by lowering the chroma value of the selected color, while keeping the same luminance value, until the closest in-gamut color having the desired luminance value was found. However, this would result in the selected in-gamut highlight color having a low chroma value relative to the chroma value of the original highlight color. As a result, the converted highlight color would have both low luminance contrast and low chromatic contrast with respect to the dark background, which would in turn make the converted highlight color very difficult to see with respect to the dark background. Thus, previously known color conversion processes have difficulty converting highlight colors for dark viewing mode that, before conversion, have a low luminance contrast and a high chromatic contrast with respect to a light background because the conversion process would result in selection of a converted highlight color having low luminance contrast and low chromatic contrast with respect to the dark background.

The limited ability to preserve highlight color formatting when switching to a dark viewing mode is a technical problem which can limit the accessibility of digital content to various users that would otherwise benefit from having the ability to convert content to a dark viewing mode. For example, some users have visual impairments, such as light sensitivity, photophobia, and low contrast sensitivity, which can make it difficult to look at or process bright colors. Other users may have dyslexia or visual processing disorders which can make it difficult to interpret black text on a white background. The limitations associated with current systems and methods of providing a dark viewing mode can deter these users from utilizing applications and tools that would otherwise improve the ability of these users to perform various tasks, such as reading emails and messages, viewing web pages, and generating digital content.

To address the technical problems associated with providing a dark viewing mode, this description provides technical solutions in the form of systems and methods of enhancing visual contrast that preserves the text and highlight color formatting of the original digital content when converting the digital content for a dark viewing mode. The systems and methods described herein include evaluations of the luminance and chroma of background colors, including highlight colors, of the original digital content prior to converting the digital content for the dark viewing mode. The systems and methods described herein evaluate the luminance and chroma of highlight colors to identify highlight colors having a high luminance value, i.e., a luminance value that exceeds a predetermined luminance threshold value, and a high chroma value, i.e., a chroma value that exceeds a predetermined chroma threshold value. As discussed above, highlight colors having high luminance values and high chroma values would typically result in converted highlight colors having low luminance and low chroma values and corresponding low luminance contrast and low chromatic contrast with respect to a dark background. To enable conversion of highlight colors in a manner that enhances the visual contrast of the highlight color relative to the dark background in a dark viewing mode, the luminance values of highlight colors having high luminance and high chroma are clamped to a predetermined lower luminance value before the highlight color is converted for the dark viewing mode. More specifically, when a highlight color has a luminance that exceeds the luminance threshold and a chroma that exceeds the chroma threshold, the luminance of the highlight color is clamped to a predetermined lower luminance value, so that the brightness of the color is moved farther from pure white. As a result, when the highlight color is converted for the dark viewing mode by selecting the color with the opposite luminance value, this will result in selection of a highlight color having a brightness that is moved farther from black which in turn increases the luminance contrast with respect to the dark background in the dark viewing mode. In various implementations, the value at which the luminance is clamped is any suitable value that results in sufficient luminance contrast when the highlight color is converted for the dark viewing mode to satisfy a predetermined visibility threshold value for the luminance contrast. In various implementations, the visibility threshold corresponds to the recommended luminance contrast ratio defined by the WCAG for the visual presentation of text, e.g., 4.5:1. In other implementations, any suitable visibility threshold may be used for the luminance contrast.

Referring now to the drawings, FIG. 1 illustrates an example system 100, upon which aspects of this disclosure may be implemented. The system 100 includes a user computing device 102 having at least one user input device 104. Non-limiting examples of the user computing device 102 include a laptop computer, a desktop computer, a tablet computer, a smart phone, a tablet, a personal digital assistant (PDA), and the like. The computing device 102 has at least one display device 106 for displaying images, text, and video. The display device 106 may use LCD, plasma, LED, iOLED, CRT, or any other appropriate technology. The at least one user input device 104 comprises a keyboard, mouse, touchscreen, and the like via which user input is provided to the computing device 106.

The computing device 102 includes at least one software application 108, such as an email application, a messaging application, a word processing application, a web browsing application, or any other application, capable of viewing, generating, and/or modifying digital content. The software application 108 includes a graphical user interface (GUI) 110 and a content display component 112. The GUI 110 includes window(s), controls, and other elements which define the appearance of the application 108. The content display area corresponds to a canvas or similar type of element capable of displaying digital content. The digital content can include email messages, documents, web pages, and the like, which can originate from a variety of clients and/or providers. The digital content includes text and background which can be displayed with various user and/or system defined options, e.g., font, size, color, and the like. Text and background formatting can be specified in any suitable manner. For example, in some implementations, cascading style sheets (CSS) may define the visual characteristics for the text and background of the digital content. In other implementations, any suitable means of specifying the visual characteristics for the text and background of the digital content can be used.

The computing device 102 includes a viewing mode application 114 which enables the GUI 110 and digital content in the content display area 112 to be displayed in a light viewing mode and a dark viewing mode. In the light viewing mode, background elements (e.g., interface elements, UI controls, backgrounds, etc. are displayed with light colors (e.g., white and/or light or pale shades of various colors, such as gray, blue, yellow, etc.) and foreground elements (e.g., text, icons, etc.) are displayed with dark colors (e.g., black and dark shades of various colors, such as gray, blue, red, etc.). In the dark viewing mode, a dark mode conversion process is performed to select the text colors and background colors to use to display the digital content in the dark viewing mode. The software application 108 includes at least one user interface control, such as a toggle, button, selectable menu item, etc. that enables the viewing mode for the application 108 to be selected, e.g., by user input received via the user input device 104.

In some implementations, the viewing mode application 114 is integrated into the software application 108 as an add-on, extension, or the like. In other implementations, the viewing mode application 114 is a stand-alone application which can provide light and dark viewing mode support for the software applications 108 and other compatible applications which may be installed and executed on the computing device 102. As an alternative to local viewing mode applications, the view mode control application is implemented as cloud-based service 118 that communicates with the software application 108 via a network 116 to provide light and dark viewing modes for the software application 108. The network 116 can include wired networks, wireless networks, or a combination thereof that enable communications between the various entities in the system 100. In some configurations, the communication network 116 includes cable networks, the Internet, local area networks (LANs), wide area networks (WAN), mobile telephone networks (MTNs), and other types of networks, possibly used in conjunction with one another, to facilitate communication between the user computing device 102 and the service 118.

The viewing mode service 118 may be implemented by a server 120 which is configured to provide computational and/or storage resources for the viewing mode service 118. The software application 108 may include a viewing mode client (not shown) which enables the software application 108 to interact with and access the functionality provided by the viewing mode service 118. Program code, instructions, user data and/or digital content for the viewing mode control service are stored in a data store 122. Although the viewing mode service 118 shows only a single server 120 and data store 122, the service 118 may be implemented using any suitable number of servers and data stores.

Figure 2:
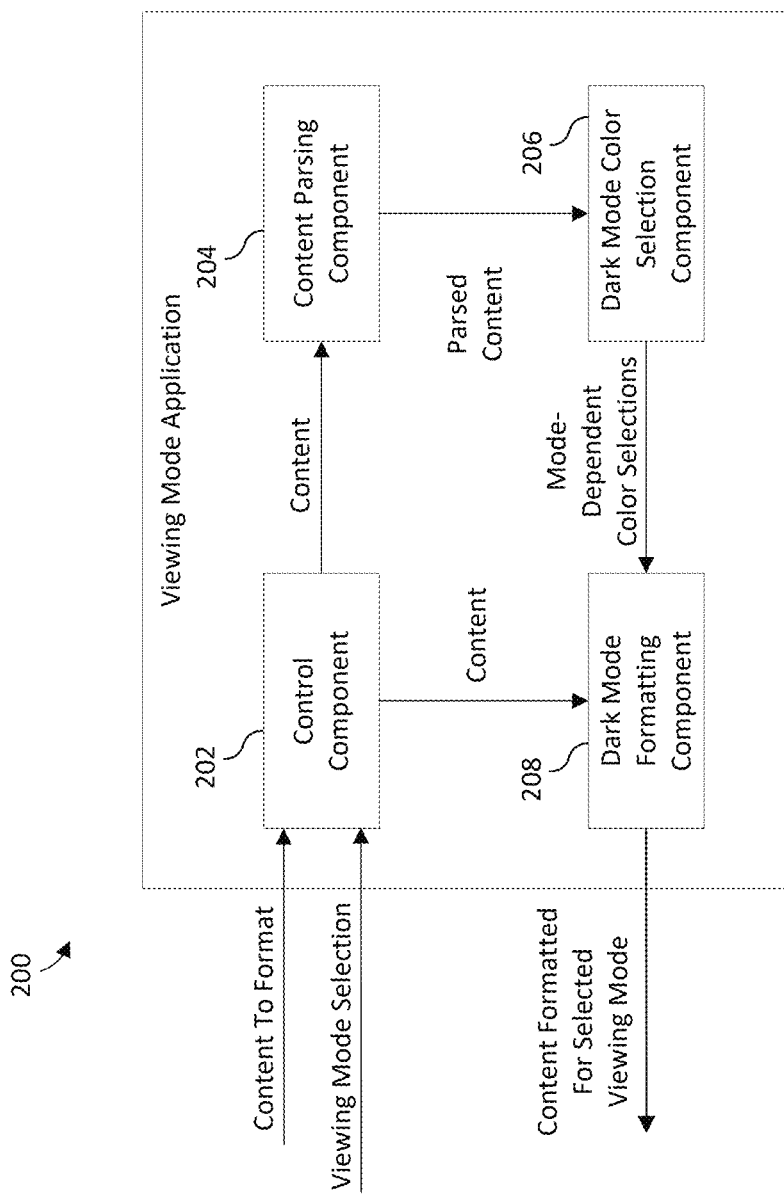
FIG. 2 depicts an example implementation of a viewing mode application that provides a dark viewing mode in accordance with this disclosure.

FIG. 2 shows an example implementation of a viewing mode application 200 that may be used as the viewing mode application 114 or the viewing mode service 118 of FIG. 1. The viewing mode application 200 receives the content to format and a viewing mode selection from a software application (e.g., software application 108 of FIG. 1). The viewing mode selection indicates the viewing mode (e.g., light or dark) to use as the basis for formatting the content. The content may be received through a network or may be generated locally on a user's computing device. In various implementations, the content is hypertext markup link (HTML) document received through a network. The content may include email messages received in an email application, web pages to be displayed in a browser application, word processing documents to be displayed in a word processor application, and the like. The digital content includes text and background color formatting that is independent is defined by color information included with the digital content. The color information can be specified by metadata included with the digital content. In some implementations, the digital content is provided in an HTML format which defines the structure, styles, and visual characteristics of the digital content using HTML elements, e.g., tags. In other implementations, the structure and visual characteristics of the digital content to be formatted is specified by cascading style sheets (CSS) or other similar means of specifying text and background color formatting of the digital content.

The viewing mode application performs a light mode conversion process on digital content that is to be formatted to provide a light viewing mode when light viewing mode is selected and performs a dark mode conversion process on digital content that is to be formatted to provide a dark viewing mode when dark viewing mode is selected. In various implementations, the light viewing mode corresponds to the normal or default viewing mode for the application and involves displaying digital content with dark text on a light background. Since most digital content is typically provided in a light mode format (e.g., dark text on a light background), the light viewing mode may only be required to be used to return digital content to its original colors after the digital content has been formatted to provide a dark viewing mode. The light viewing mode may therefore be implemented in a number of ways. For example, if digital content is provided initially with a light viewing format (e.g., dark text on a light background), the application 200 can save the text and background color formats of the digital content to use to convert the digital content back to light viewing mode after the digital content has been converted to provide a dark viewing mode.

Since this disclosure is primarily intended to address technical problems associated with formatting digital content to provide a dark viewing mode, the following description will be directed primarily to the implementation of the dark mode conversion process that solves those technical problems. The viewing mode application 200 of FIG. 2 includes a control component 202, a digital content parsing component 204, a dark mode color selection component 206, and a dark mode formatting component 208 which work together to perform the dark mode conversion process. The dark mode conversion process utilizes a predetermined reference background color as the background color for the dark viewing mode. The reference background color has a reference luminance value which depends on how close the reference luminance is to the luminance of pure black which has a luminance value of zero. In various implementations, the reference background has a luminance value of 10. The luminance value of the reference background will be used to scale modified text luminance and modified background luminance values (explained in more detail below). In some implementations, the viewing mode application enables the reference color for the dark viewing mode to be specified by the user, e.g., via the user interface of the application.

The control component 202 receives the digital content to format and the view mode selection that specifies the viewing mode (i.e., light or dark) to use in formatting the digital content. The control component 202 provides the digital content to be formatted to the digital content parsing component. 104 which parses the digital content into one or more digital content elements. In various implementations, each digital content element includes text which is defined by at least one text color and a background which is defined by at least one background color. When the received digital content is in HTML format, the digital content can be parsed into objects based at least in part on the characteristics of the digital content as defined by HTML elements. If the received digital content is in a format other than HTML, parsing the digital content can include examining the digital content to identify sections or elements having different visual characteristics (e.g., background color, text color, text style, etc.) and parse the digital content into digital content elements based on the identified visual characteristics. The digital content can be parsed using any suitable method or technique that enables the digital content to be parsed into elements having at least one text color and at least one background color.

The parsed digital content is provided to the dark mode color selection component 206 which processes each digital content element to select a text luminance to use to format the text color and a background luminance to use to format the background color of the digital content element. The dark mode color selection component implements a text luminance selection process (explained in more detail below) to select a text luminance to use to format the text of each digital content element to provide the dark viewing mode. The dark mode color selection component also implements a background color selection process (explained in more detail below) to select a background luminance to use to format the background of each digital content element to provide the dark viewing mode. The selected text luminance and selected background luminance are then provided to the dark mode formatting component 208 which formats the digital content based on the selected text luminance and selected background luminance values to produced digital content that has been formatted to provide the dark viewing mode. Any suitable method of generating formatted digital content based on the selected text luminance and selected background luminance may be used.

Figure 3:
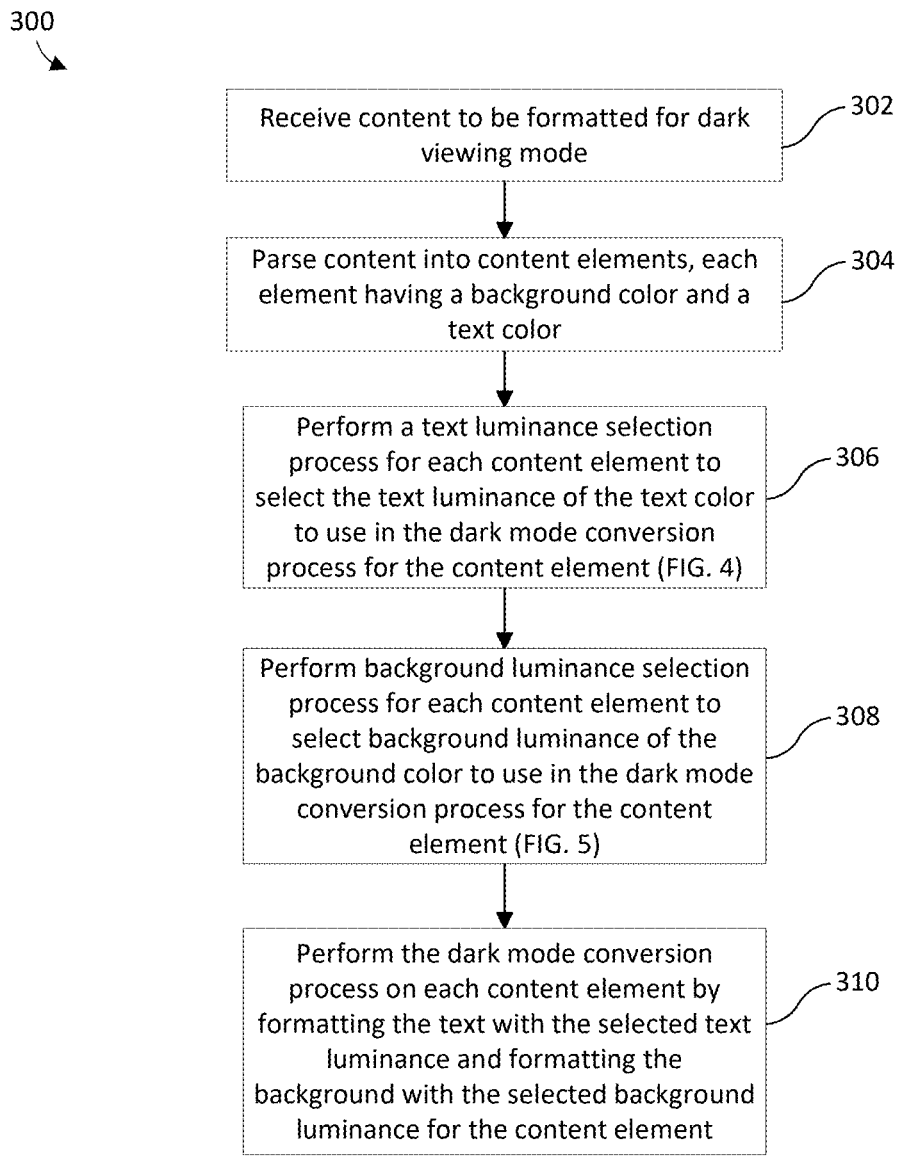
FIG. 3 shows a flowchart of an example dark mode conversion process that may be performed by the viewing mode application of FIG. 2.

A flowchart of an example method of providing a dark viewing mode with enhanced visual contrast for improved visibility which may be implemented by the components of the viewing mode application 200 is shown in FIG. 3. The method begins with receiving digital content to be formatted to provide a dark viewing mode (block 302). The digital content is parsed into digital content elements (block 304). Each digital content element includes text and has a text color and a background color that is used to depict the text. A text luminance selection process (FIG. 4) is used to process each digital content element to select a text luminance to use to format the text color of the digital content element (block 306). A background luminance selection process (FIG. 5) is used to process each digital content element to select a background luminance to use or the background color of the digital content element (block 308). Once the text luminance and background luminance have been selected for each digital content element, each digital content element is formatted based on the selected text luminance and selected background luminance to generate a dark viewing mode of the digital content (block 310).

Figure 4:
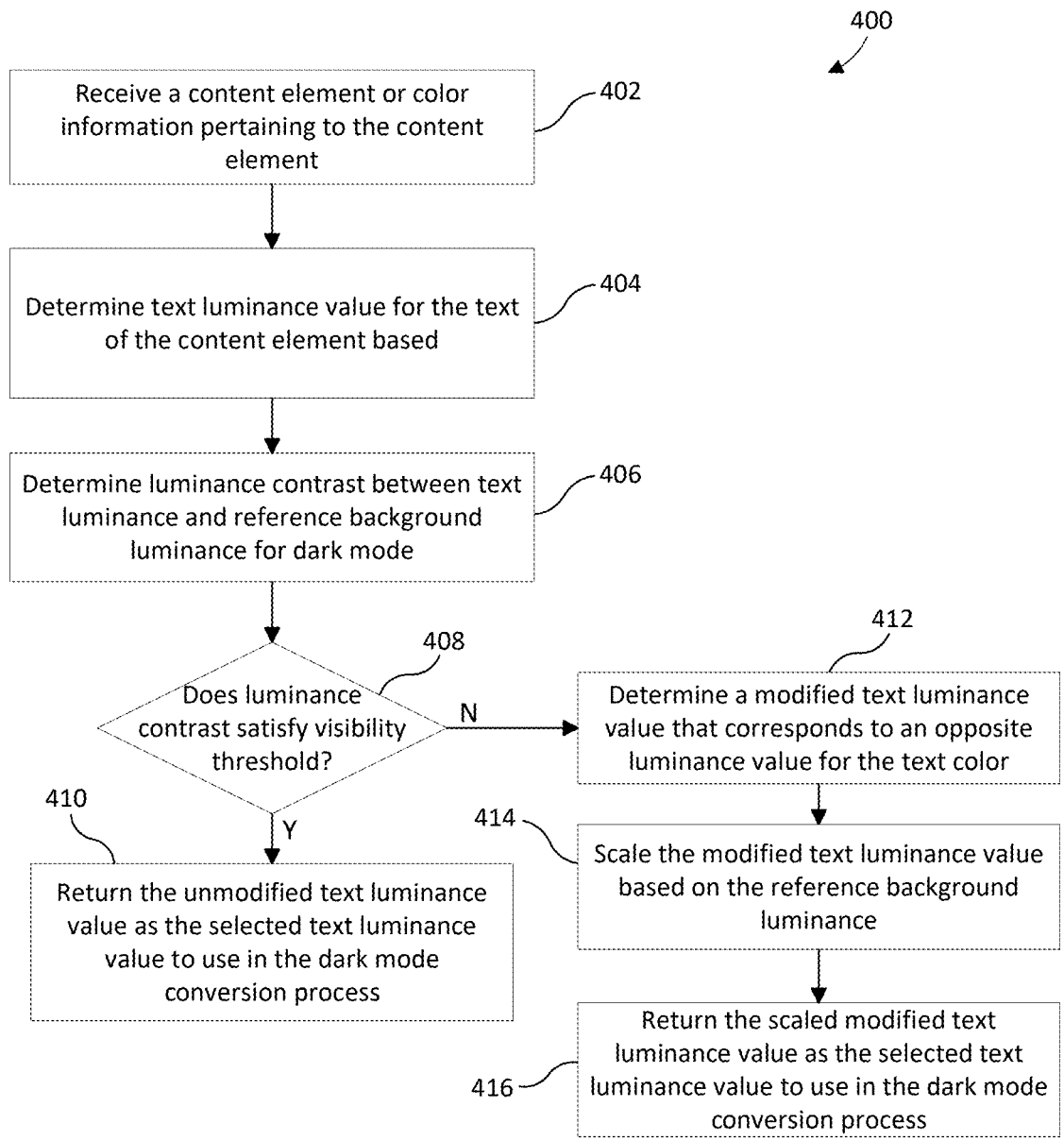
FIG. 4 shows a flowchart of an example text luminance selection process that may be performed as part of the dark mode conversion process of FIG. 3.

A flowchart of an example implementation of a text luminance selection process 400 is shown in FIG. 4. The text luminance selection process begins with receiving a digital content element, or at least color information pertaining to the digital content element, for which a text luminance value is to be selected (block 402). A luminance value of the original text of the digital content element is then determined (block 404). Determining the luminance value of the text can be accomplished in any suitable manner. For example, in some implementations, the luminance value is determined based on the RGB color values of the text color. The RGB color values can be determined from the text color defined by color information included with the digital content, such as metadata, HTML tags, CSS properties, and the like. A luminance contrast is then determined that corresponds to a ratio of the original text luminance and the luminance of the reference background for the dark viewing mode. The luminance contrast is compared to a visibility threshold value to determine whether the original text is considered visible (and readable) with respect to the luminance value of the reference background for the dark viewing mode (block 408). Any suitable visibility threshold can be used to determine whether text is considered viewable against a background color/luminance. For example, the visibility threshold can be based on a contrast ratio defined by WCAG which recommends a minimum contrast ratio of 4.5:1 for normal text and 3:1 for large text. In this case, the contrast ratio corresponds to $(L_1+0.05)/(L_2+0.05)$ where $L_1$ and $L_2$ are the respective luminance values for the two colors being compared.

If the luminance contrast meets or exceeds the visibility threshold (block 408), the original text luminance is considered visible with respect to the reference background. In this case, the unmodified text luminance of the original text is selected as the text luminance to use for the dark mode conversion process for the digital content element (block 410). If the luminance contrast does not satisfy the visibility threshold (i.e., the text luminance is not considered visible with respect to the luminance of the reference background), a modified text luminance is determined (412). The modified text luminance corresponds to a luminance having a value that is opposite of the luminance value of the original text. The opposite luminance value can be calculated in any suitable manner. For example, if luminance is defined on a scale of 0 to 100, the opposite luminance value L' for a color having a luminance value L can determined using the formula L'=100−L. The text color used for dark viewing mode therefore corresponds to the original text color depicted with the opposite luminance value relative to the luminance value of the text color as depicted in light viewing mode. As a result, the visibility of the text color against the dark background is improved.

Once the modified text luminance has been determined, the modified text luminance is scaled based on the reference background luminance (block 414). This is done to compensate for the difference between the reference background color (e.g., luminance>0) and the pure black (i.e., luminance=0). Scaling the modified text luminance can be done using the following formula: L'=(100−L)*(100−10)/100+10, where L' corresponds to the scaled text luminance, the luminance values are considered on a scale from 0-100, and the luminance value of the reference background is 10. Please note that prior to performing calculations involving luminance values, the color space used to define the text and background colors can be converted to a different color space which provides a luminance scale that facilitates performing calculations, such as determining an opposite luminance value for a given luminance and scaling luminance values to compensate for differences between a reference luminance and 0 luminance (i.e., pure black). In various limitations, the original color space used to define the text color and background color can be converted to a color space that has specific parameter for luminance, such as OKLCH, CIELUV color space (or any equivalent non-linear color space such as CIELAB, CIE XYZ, or XYZ), before determining the luminance contrast, the opposite luminance, and the scaled luminance values. In this case, once the modified text luminance has been scaled, the color space used to define the text luminance can be converted back to the original color space. Once the modified text luminance has been scaled (and the color space converted back to an original color space if necessary), the scaled modified text luminance value is return as the selected text luminance value to use in the dark mode conversion process (block 416).

Figure 5:
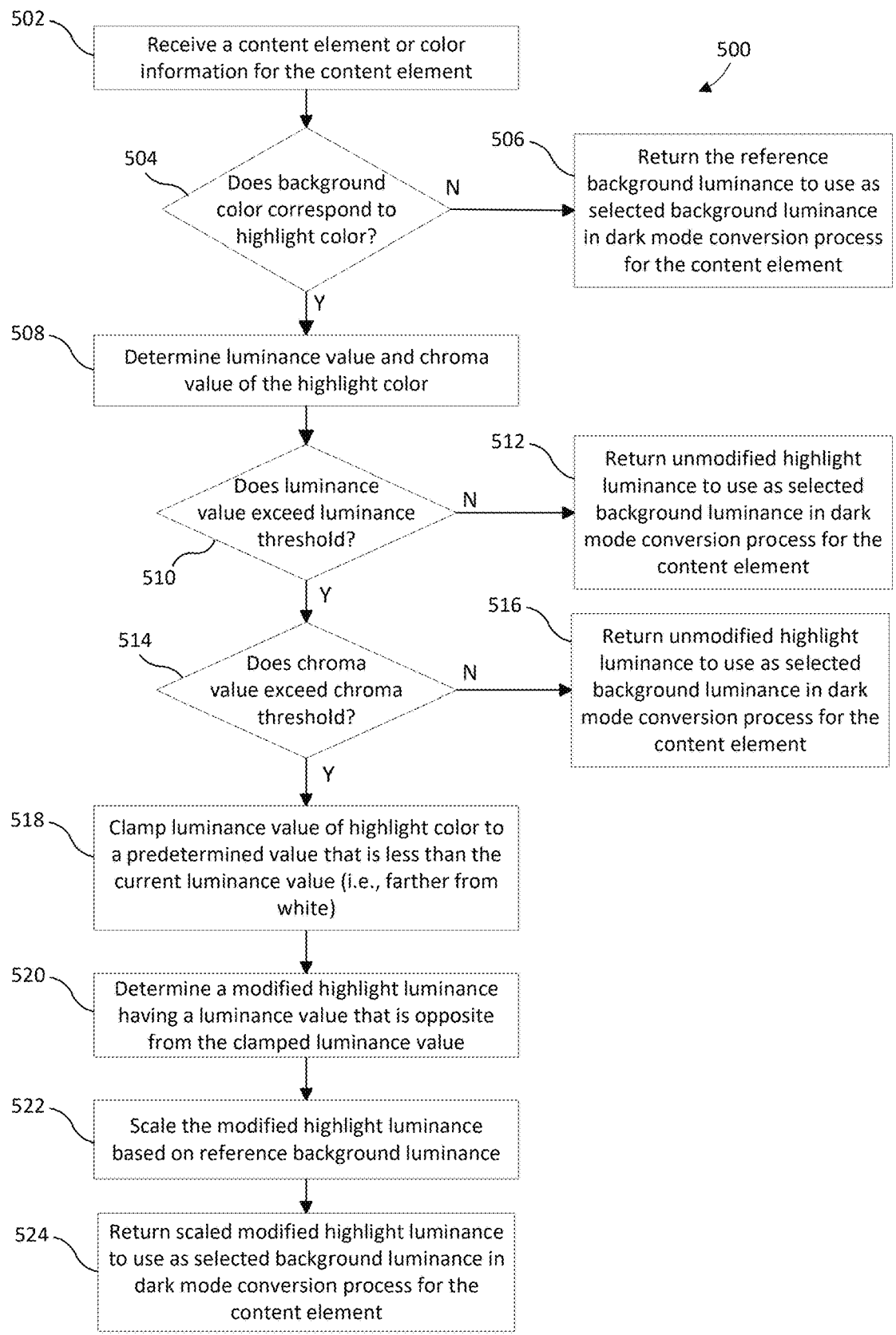
FIG. 5 shows a flowchart of an example background luminance selection process that may be performed as part of the dark mode conversion process of FIG. 3.

A flowchart of an example implementation of a background luminance selection process 500 is shown in FIG. 5. The process begins with receiving a digital content element, or color information pertaining to the digital content element (block 502). A determination is then made as to whether the original background color/luminance indicates that the background color is a highlight color (i.e., a color used for the background of selected text to visually distinguish the selected text from other unhighlighted text) (block 504). Determining whether the background color of a digital content element is a highlight color can be accomplished in any suitable manner. For example, a background color having a bright yellow, green, red, or similar color can be indicative of a highlight color. If the background color is determined to not be a highlight color, the reference background color/luminance is returned to use as the selected background luminance in the dark mode conversion process for the digital content element (block 506).

If the background color of the digital content element is a highlight color, a luminance value and a chroma value are determined for the background color of the digital content element (block 508). In various implementations, the luminance and chroma values for the background color are determined with reference to a color space that is used to represent to background color. This may require that the original color space be converted to a color space having defined luminance and chroma parameters, such as the CIELUV color space or other suitable color space.

As discussed above, previously known methods of handling highlight colors used as the background of text in digital content were substantially the same as the text luminance selection process shown in FIG. 4. First a determination is made as to whether the luminance contrast between the highlight color and the reference background color satisfied a predetermined visibility standard, such as the contrast ratio recommendations provided by the WCAG. If the luminance contrast did not satisfy the visibility standard, the luminance value of the highlight color is flipped by using the opposite luminance value for the highlight color in the dark conversion mode. This in turn can result in selection of a luminance value for a color that is out of gamut (i.e. not capable of being represented within a given color space). The out-of-gamut color typically has a luminance value that is above the upper level boundary for the luminance value. When converting a highlight color for dark viewing mode results in the selection of an out-of-gamut color/luminance, previously known methods would resort to a fall back method of selecting a modified luminance value for the highlight color by selecting the closest color that is in-gamut and that has the desired luminance. Selecting a substitute color for the out-of-gamut color in this manner results in the selection of a highlight color having a much lower chroma (i.e., is much darker) than the highlight color in the original digital content. When used as the highlight color in dark viewing mode, the low chroma of the substitute highlight color would result in low chromatic contrast between the substitute highlight color and the dark background which can significantly impact the visibility of the highlight color relative to the dark background.

To address the difficulties associated with converting highlight colors to appropriate highlight colors for use in providing a dark viewing mode, the background color selection process evaluates both the luminance and chroma values of highlight colors before conversion to identify highlight colors which have both a high luminance and a high chroma. Highlight colors having high luminance and high chroma would result in a highlight color having low luminance and low chroma when the luminance is flipped during the dark mode conversion process. Such colors would be very difficult to view against the dark background in dark viewing mode. The present disclosure provides a method of converting highlight colors having high luminance and high chroma that prevents the selection of out-of-gamut color/luminance and that enhances the viewing contrast of the converted highlight color relative to the dark background in dark viewing mode. The method involves first identifying highlight colors having a luminance value that exceeds a predetermined luminance value threshold and a chroma value that exceeds a predetermined chroma value threshold. The threshold values are selected to identify highlight colors having luminance values and chroma values that would likely result in selection of an out-of-gamut color when converting the highlight color for the dark viewing mode. For example, in various implementations, the luminance threshold value is set to 0.7 and the chroma threshold value is set to 0.15, although any suitable values for these thresholds may be utilized.

Returning to FIG. 5, a determination is made as to whether the luminance value of the highlight color exceeds the predetermined luminance value threshold (block 510), and a determination is made as to whether the chroma value of the highlight color exceeds the predetermined luminance value threshold (block 512). If the luminance value does not exceed the luminance value threshold and/or the chroma value does not exceed the chroma value threshold, the unmodified highlight (or background) color is returned to use as the selected background luminance in the dark mode conversion process for the digital content element (blocks 5121 and 516). If the luminance value does exceed the luminance value threshold and the chroma value does exceed the chroma value threshold, the luminance value of the highlight color is clamped, or set, to a predetermined clamped luminance value that is lower than the luminance value of the original highlight color (i.e., farther from pure white) (block 518). In various implementations, the predetermined clamped luminance value is 70 on a scale where the luminance of pure white is 100 and the luminance of pure black is 0. This will result in the converted highlight color having a luminance that is farther from black. For example, after the luminance value of the original highlight color is clamped (block 518), a modified background luminance is determined that is the opposite of the clamped luminance value (block 520). The opposite luminance value corresponds to maximum luminance value (e.g., 100) minus the luminance value that is being converted (i.e., 70). Therefore, using this example, the modified luminance value that results from converting the highlight color for the dark viewing mode is 30. This luminance value is farther from pure black (luminance=0) than the luminance value that would result from previously known luminance conversion processes. This in turn increases the luminance contrast of the converted highlight color without impacting the chroma contrast, so the visibility of the converted highlight color against the dark background is significantly improved relative to the visibility of highlight colors converted using previously known methods.

The modified background, or highlight, luminance is then scaled to compensate for the difference between the reference background luminance (luminance>0) and pure black (luminance=0) (block 522). The modified highlight luminance may be scaled in the same manner described above for the modified text luminance. The scaled modified highlight luminance is the returned to use as the selected background luminance in the dark mode conversion process for the digital content element (block 524).

Figure 6:
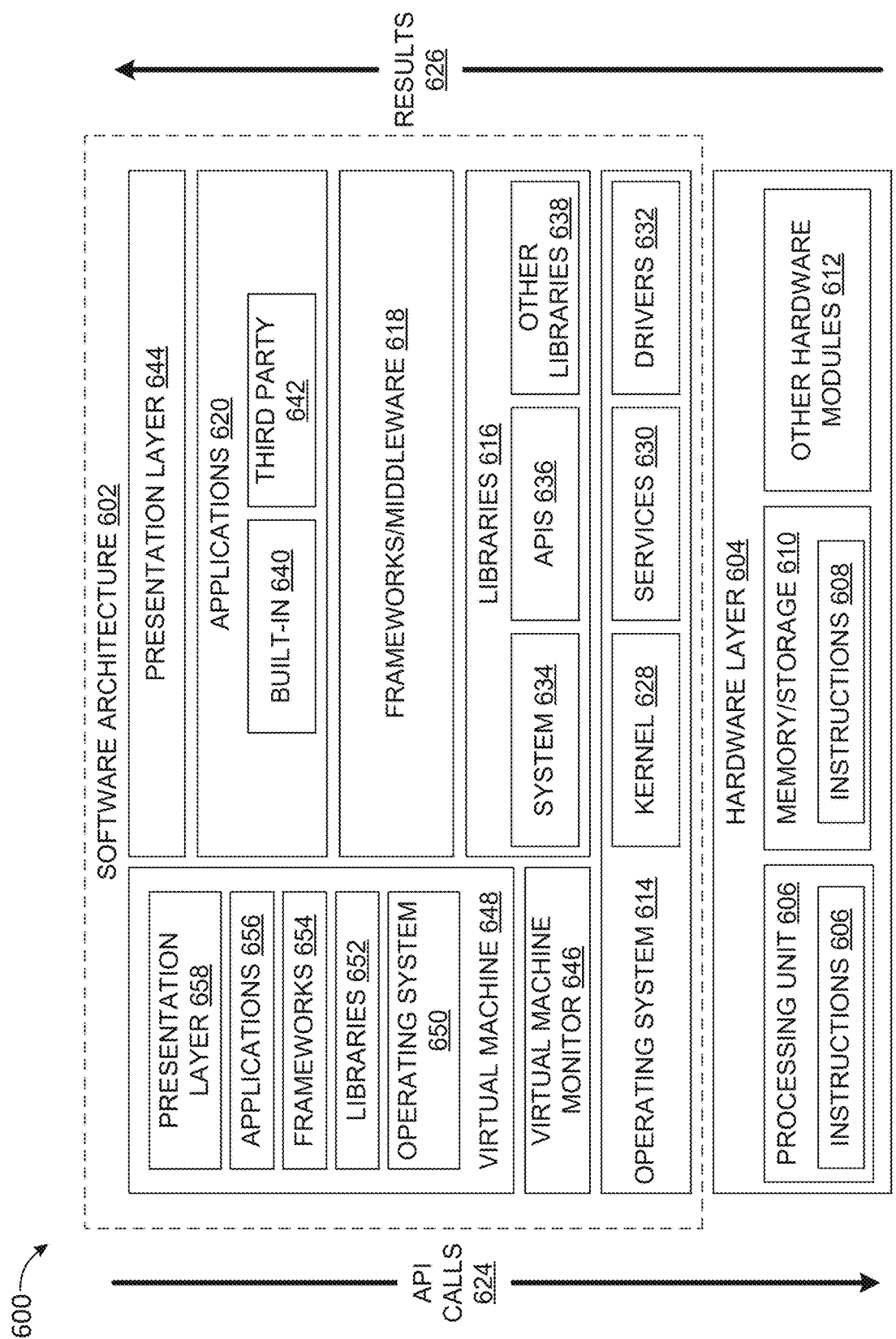
FIG. 6 is a block diagram showing an example software architecture, various portions of which may be used in conjunction with various hardware architectures herein described, which may implement any of the described features.

FIG. 6 is a block diagram 600 illustrating an example software architecture 602, various portions of which may be used in conjunction with various hardware architectures herein described, which may implement any of the above-described features. FIG. 6 is a non-limiting example of a software architecture, and it will be appreciated that many other architectures may be implemented to facilitate the functionality described herein. The software architecture 602 may execute on hardware such as a machine 700 of FIG. 7 that includes, among other things, processors 710, memory 730, and input/output (I/O) components 750. A representative hardware layer 604 is illustrated and can represent, for example, the machine 700 of FIG. 7. The representative hardware layer 604 includes a processing unit 606 and associated executable instructions 608. The executable instructions 608 represent executable instructions of the software architecture 602, including implementation of the methods, modules and so forth described herein. The hardware layer 604 also includes a memory/storage 610, which also includes the executable instructions 608 and accompanying data. The hardware layer 604 may also include other hardware modules 612. Instructions 608 held by processing unit 606 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 644. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 640 and/or third-party applications 642. Examples of built-in applications 640 may include, but are not limited to, a contacts application, a browser application, a location application, a media application, a messaging application, and/or a game application. Third-party applications 642 may include any applications developed by an entity other than the vendor of the particular platform. The applications 620 may use functions available via OS 614, libraries 616, frameworks 618, and presentation layer 644 to create user interfaces to interact with users.

Some software architectures use virtual machines, as illustrated by a virtual machine 648. The virtual machine 648 provides an execution environment where applications/modules can execute as if they were executing on a hardware machine (such as the machine 700 of FIG. 7, for example). The virtual machine 648 may be hosted by a host OS (for example, OS 614) or hypervisor, and may have a virtual machine monitor 646 which manages operation of the virtual machine 648 and interoperation with the host operating system. A software architecture, which may be different from software architecture 602 outside of the virtual machine, executes within the virtual machine 648 such as an OS 650, libraries 652, frameworks 654, applications 656, and/or a presentation layer 658.

Figure 7:
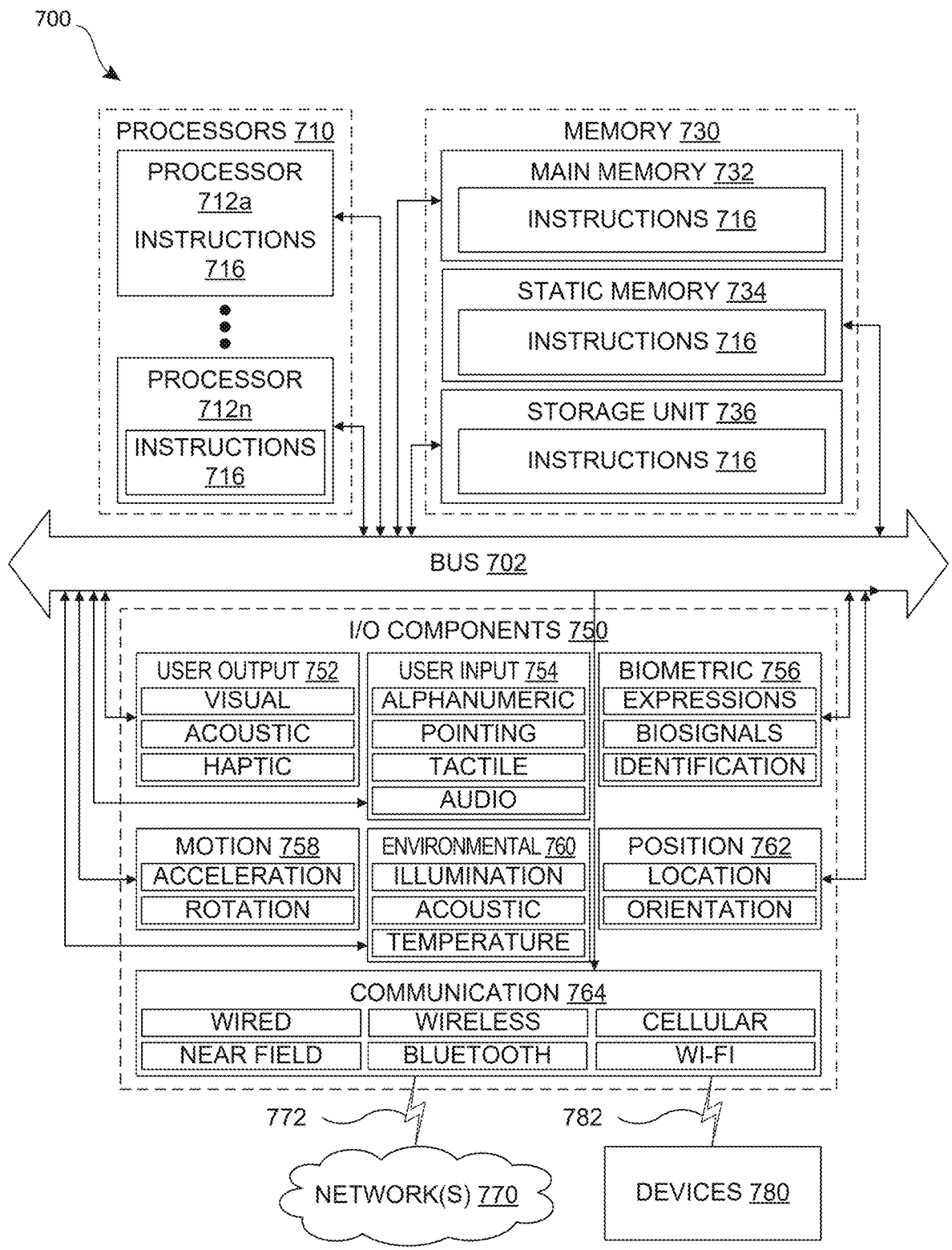
FIG. 7 is a block diagram showing components of an example machine configured to read instructions from a machine-readable medium and perform any of the features described herein.

FIG. 7 is a block diagram illustrating components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement modules or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712a to 712n that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756, motion components 758, environmental components 760, and/or position components 762, among a wide array of other physical sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 758 may include, for example, acceleration sensors (for example, an accelerometer) and rotation sensors (for example, a gyroscope). The environmental components 760 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 762 may include, for example, location sensors (for example, a Global Position System (GPS) receiver), altitude sensors (for example, an air pressure sensor from which altitude may be derived), and/or orientation sensors (for example, magnetometers).

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 764 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 762, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article or apparatus are capable of performing all of the recited functions.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system for providing a dark viewing mode with enhanced viewing contrast, the data processing system comprising:
   a processor; and
   a memory in communication with the processor, the memory comprising executable instructions that, when executed by the processor alone or in combination with other processors, cause the data processing system to perform functions of:
   receiving digital content that is to be displayed in a content display area of a graphical user interface (GUI) of a software application on a display device in a dark viewing mode, the digital content including highlighted text and a background, the highlighted text being defined by a text color and a first highlight color;
   parsing the digital content to extract the text color, the first highlight color, and a first background color using the processor;
   converting the text color into a first text luminance value and the first highlight color into a first highlight luminance value and a chroma value using a color conversion component which is programmed to convert colors from a first color space to corresponding representations in a second color space;
   performing a dark mode conversion process on the digital content to generate modified digital content using the processor, the dark mode conversion process including:
      accessing the memory to retrieve a predetermined background luminance value for the dark viewing mode;
      determining a luminance contrast between the first text luminance value and the predetermined background luminance value and correlating the luminance contrast to a second text luminance value for the dark viewing mode using the color conversion component; and
      selecting a modified highlight luminance value for the dark viewing mode by performing a highlight luminance selection process using the processor, the highlight luminance selection process comprising:
         accessing the memory to retrieve a predetermined luminance value threshold and a predetermined chroma value threshold;
         comparing the first highlight luminance value to the predetermined luminance value threshold and the chroma value to the predetermined chroma value threshold using the processor;
         in response to the first highlight luminance value being below the luminance value threshold or the chroma value being below the chroma value threshold, selecting the first highlight luminance value as a selected luminance value for the first highlight color;

in response to the first highlight luminance value exceeding the luminance value threshold and the chroma value exceeding the chroma value threshold, selecting a predetermined second highlight luminance value as the selected luminance value for the first highlight color, the second highlight luminance value being less than the first highlight luminance value; and setting the modified highlight luminance value to an opposite luminance value from the selected luminance value using the processor;

converting the predetermined background luminance value, the second text luminance value, and the modified highlight luminance value into a second background color, a second text color, and a modified highlight color, respectively, for the dark viewing mode using the color conversion component;

automatically generating the modified digital content by changing the first background color of the digital content to the second background color, changing the first text luminance value of the digital content to the second text luminance value, and changing the first highlight color of the digital content to the modified highlight color using the processor; and rendering the modified digital content in the content display area of the GUI of the software application on the display device in place of the digital content.

2. The data processing system of claim 1, wherein the predetermined background luminance value of the second background color is greater than a luminance of pure black, and wherein the executable instructions include instructions for causing the data processing system to perform further functions of:

scaling the modified highlight luminance value to compensate for a difference between the predetermined background luminance value of the second background color and the luminance of pure black.

3. The data processing system of claim 1, wherein the first color space is RGB and the second color space is OKLCH.

4. The data processing system of claim 1, wherein the modified highlight luminance value is out-of-gamut with respect to the first color space, and wherein the modified highlight color corresponds to a closest highlight color having the modified highlight luminance value that is in-gamut.

5. The data processing system of claim 1, wherein the predetermined background luminance value is selected to cause an increase in a luminance contrast and a chromatic contrast between the modified highlight color and the predetermined background luminance value of the second background color relative to a luminance contrast and a chromatic contrast between the first highlight luminance value and the predetermined background luminance value of the second background color.

6. The data processing system of claim 1, wherein pure white has a luminance value that corresponds to 100% luminance and the modified highlight luminance value corresponds to 70% luminance.

7. The data processing system of claim 1, wherein the executable instructions include instructions for causing the data processing system to perform further functions of:

parsing the digital content into a plurality of digital content elements; and performing the dark mode conversion process on each of the digital content elements to generate the modified digital content.

8. A method of providing a dark viewing mode with enhanced viewing contrast for a software application, the method comprising:

receiving digital content that is to be displayed in a content display area of a graphical user interface (GUI) of a software application on a display device in a dark viewing mode, the digital content including highlighted text and a background, the highlighted text being defined by a text color and a first highlight color, the background being defined by a first background color;

parsing the digital content to extract the text color, the first highlight color, and the first background color using a processor;

converting the text color into a first text luminance value, the first highlight color into a first highlight luminance value and a chroma value, and the first background color into a first background luminance using a color conversion component which is programmed to convert colors from a first color space to corresponding representations in a second color space;

performing a dark mode conversion process on the digital content to generate modified digital content using the processor, the dark mode conversion process including:

accessing a memory to retrieve a predetermined background luminance value for the dark viewing mode;

determining a luminance contrast between the first text luminance value and the predetermined background luminance value and correlating the luminance contrast to a second text luminance value for the dark viewing mode using the color conversion component; and selecting a modified highlight luminance value for the dark viewing mode by performing a highlight luminance selection process using the processor, the highlight luminance selection process comprising:

accessing the memory to retrieve a predetermined luminance value threshold and a predetermined chroma value threshold;

comparing the first highlight luminance value to the predetermined luminance value threshold and the chroma value to the predetermined chroma value threshold using the processor;

in response to the first highlight luminance value being below the luminance value threshold or the chroma value being below the chroma value threshold, selecting the first highlight luminance value as a selected luminance value for the first highlight color;

in response to the first highlight luminance value exceeding the luminance value threshold and the chroma value exceeding the chroma value threshold, selecting a predetermined second highlight luminance value as the selected luminance value for the first highlight color, the second highlight luminance value being less than the first highlight luminance value; and setting the modified highlight luminance value to an opposite luminance value from the selected luminance value using the processor;

converting the predetermined background luminance value, the second text luminance value, and the modified highlight luminance value into a second background color, a second text color, and a modified highlight color, respectively, for the dark viewing mode using the color conversion component;

automatically generating the modified digital content by changing the first background color of the digital content to the second background color, changing the first text luminance value of the digital content to the second text luminance value, and changing the first highlight color of the digital content to the modified highlight color using the processor; and rendering the modified digital content in the content display area of the GUI of the software application on the display device in place of the digital content.

9. The method of claim 8, wherein the predetermined background luminance of the second background color is greater than a luminance of pure black, and wherein the method further comprises:
scaling the modified highlight luminance value to compensate for a difference between the predetermined background luminance of the second background color and the luminance of pure black.

10. The method of claim 8, wherein the first color space is RGB and the second color space is OKLCH.

11. The method of claim 8, wherein the modified highlight luminance value is out-of-gamut with respect to the first color space, and wherein the modified highlight color corresponds to a closest highlight color having the modified highlight luminance value that is in-gamut.

12. The method of claim 8, wherein the predetermined background luminance value is selected to cause an increase in a luminance contrast and a chromatic contrast between the modified highlight color and the predetermined background luminance value of the second background color relative to a luminance contrast and a chromatic contrast between the first highlight luminance value and the predetermined background luminance value of the second background color.

13. The method of claim 8, wherein pure white has a luminance value that corresponds to 100% luminance and the modified highlight luminance value corresponds to 70% luminance.

14. The method of claim 8, further comprising:
parsing the digital content into a plurality of digital content elements;
performing the dark mode conversion process on each of the digital content elements to generate the modified digital content.

15. A non-transitory computer readable medium on which are stored instructions that, when executed, cause a programmable device to perform functions of:
receiving digital content that is to be displayed in a content display area of a graphical user interface (GUI) of a software application on a display device in a dark viewing mode, the digital content including highlighted text and a background, the highlighted text being defined by a text color and a first highlight color, the background being defined by a first background color;
parsing the digital content to extract the text color, the first highlight color, and the first background color using a processor;
converting the text color into a first text luminance value, the first highlight color into a first highlight luminance value and a chroma value, and the first background color into a first background luminance using a color conversion component which is programmed to convert colors from a first color space to corresponding representations in a second color space;

performing a dark mode conversion process on the digital content to generate modified digital content using the processor, the dark mode conversion process including:
accessing a memory to retrieve a predetermined background luminance value for the dark viewing mode;
determining a luminance contrast between the first text luminance value and the predetermined background luminance value and correlating the luminance contrast to a second text luminance value for the dark viewing mode using the color conversion component; and
selecting a modified highlight luminance value for the dark viewing mode by performing a highlight luminance selection process using the processor, the highlight luminance selection process comprising:
accessing the memory to retrieve a predetermined luminance value threshold and a predetermined chroma value threshold;
comparing the first highlight luminance value to the predetermined luminance value threshold and the chroma value to the predetermined chroma value threshold using the processor;
in response to the first highlight luminance value being below the luminance value threshold or the chroma value being below the chroma value threshold, selecting the first highlight luminance value as a selected luminance value for the first highlight color;
in response to the first highlight luminance value exceeding the luminance value threshold and the chroma value exceeding the chroma value threshold, selecting a predetermined second highlight luminance value as the selected luminance value for the first highlight color, the second highlight luminance value being less than the first highlight luminance value; and
setting the modified highlight luminance value to an opposite luminance value from the selected luminance value using the processor;
converting the predetermined background luminance value, the second text luminance value, and the modified highlight luminance value into a second background color, a second text color, and a modified highlight color, respectively, for the dark viewing mode using the color conversion component that programmed to convert luminance values from the second color space to corresponding representations in the first color space;
automatically generating the modified digital content by changing the first background color of the digital content to the second background color, changing the first text luminance value of the digital content to the second text luminance value, and changing the first highlight color of the digital content to the modified highlight color using the processor; and
rendering the modified digital content in the content display area of the GUI of the software application on the display device in place of the digital content.

16. The non-transitory computer readable medium of claim 15, wherein the predetermined background luminance value of the second background color is greater than a luminance of pure black, and wherein the functions further include:
scaling the modified highlight luminance value to compensate for a difference between the predetermined background luminance of the second background color and the luminance of pure black.

17. The non-transitory computer readable medium of claim 15, wherein the first color space is RGB and the second color space is OKLCH.

18. The non-transitory computer readable medium of claim 15, wherein the modified highlight luminance value is out-of-gamut with respect to the first color space, and
wherein the modified highlight color corresponds to a closest highlight color having the modified highlight luminance value that is in-gamut.

19. The non-transitory computer readable medium of claim 15, wherein the predetermined background luminance value is selected to cause an increase in a luminance contrast and a chromatic contrast between the modified highlight color and the predetermined background luminance value of the second background color relative to a luminance contrast and a chromatic contrast between the first highlight luminance value and the predetermined background luminance value of the second background color.

20. The non-transitory computer readable medium of claim 15, wherein the functions further comprise:
parsing the digital content into a plurality of digital content elements;
performing the dark mode conversion process on each of the digital content elements to generate the modified digital content.

\* \* \* \* \*